(12) United States Patent
Schuster

(10) Patent No.: US 6,855,380 B2
(45) Date of Patent: Feb. 15, 2005

(54) METHOD FOR THE PRODUCTION OF OPTICAL COMPONENTS WITH INCREASED STABILITY, COMPONENTS OBTAINED THEREBY AND THEIR USE

(75) Inventor: Karl-Heinz Schuster, Konigsbronn (DE)

(73) Assignee: Carl Zeiss SMT AG (DE)

( * ) Notice: Subject to any disclaimer, the term of this patent is extended or adjusted under 35 U.S.C. 154(b) by 0 days.

(21) Appl. No.: 10/147,709

(22) Filed: May 17, 2002

(65) Prior Publication Data

US 2002/0172761 A1 Nov. 21, 2002

(30) Foreign Application Priority Data

May 18, 2001 (DE) .......................... 101 24 425
Jul. 6, 2001 (DE) .......................... 101 32 819

(51) Int. Cl.[7] .............................. B05D 3/12
(52) U.S. Cl. .................. 427/596; 427/162; 427/164; 427/355; 427/402
(58) Field of Search ................. 427/596, 162, 427/164, 355, 402

(56) References Cited

U.S. PATENT DOCUMENTS 4,388,344 A * 6/1983 Shuskus et al. ............. 427/576
6,453,005 B2 * 9/2002 Kaiser ......................... 378/84

FOREIGN PATENT DOCUMENTS

| DD | DD 288 466 | 10/1983 |
|----|------------|---------|
| DE | 198 30 449 | 1/2000 |
| EP | 0 939 147 | 9/1999 |
| EP | 0 959 051 | 11/1999 |
| EP | 0 972 863 | 1/2000 |
| WO | WO 00 / 03400 | * 1/2000 |

* cited by examiner

Primary Examiner—Erma Cameron
(74) Attorney, Agent, or Firm—Nields & Lemack

(57) ABSTRACT

A method is described for the production of optical components, particularly of crystalline base material, with elevated stability and an optically active three-dimensional shape, which is defined by its surfaces, of high fit accuracy, by shaping the base material into a blank with a desired three-dimensional shape, and applying a covering layer to the surface of the thus-formed three-dimensional shape and the fit accuracy is obtained by abrasion of the covering layer.

8 Claims, 1 Drawing Sheet

METHOD FOR THE PRODUCTION OF OPTICAL COMPONENTS WITH INCREASED STABILITY, COMPONENTS OBTAINED THEREBY AND THEIR USE

BACKGROUND OF THE INVENTION

The invention concerns a method for the production of optical components, particularly those of a crystalline base material, with an increased stability as well as the components obtained thereby and their use.

Optical components, such as lenses and prisms, have been known for a long time for the production of different optics for multiple purposes of application. They are usually comprised of a base material that transmits electromagnetic radiation, and this material has an optically active three-dimensional shape or geometry, which deflects the direction of the wave beam that passes through it at its surfaces when it enters and exits. It usually happens that—insofar as possible—the optically active shape is cast directly in a pattern predominantly in the case of plastics, or in the case of optical glass or crystals is cut out of a block of material by chipping, sawing and grinding.

The surface of such optical elements, however, is not completely flat, but has microscopic roughness of variable size, which is also designated as micro-roughness. Now if a light ray impinges on such a rough spot, then it enters into an interaction with the optical element at a different entry or exit angle than a light ray striking a completely flat surface. Therefore, this ray or the electromagnetic wave is deflected in an undesired direction corresponding to the modified entry/exit angle. In this way, a light scatter arises, which is typical for each optical component or lens and which adversely affects its power.

Many investigations have already been undertaken in order to smooth the surfaces of such optical components. Since the micro-roughness of optical surfaces cannot be randomly reduced by means of grinding, polishing and etching, it has already been attempted to smooth these roughnesses by depositing a dielectric material with the same or approximately the same refractive index. As is described in DD (East Germany)-A 288,466, the dielectric layer is introduced, for example, by means of reactive electron-beam deposition. In this procedure, however, only as much material is deposited on the surface that the depressions or the troughs of the micro-roughness are more or less filled, whereupon a smoother surface results.

This method, however, assumes that the optical surface is already optimally polished prior to the deposition of the dielectric layer, i.e., an optimal or minimal micro-roughness has been produced. In order to produce such a highly polished minimal micro-roughness, however, a number of processing steps are necessary. Each processing step, however, exercises additional stress on the molecular framework, particularly on the crystal structure of the base material. In addition to the already present crystal or material defects, this stress leads to additional micro-disruptions in the molecular structure of the base material or leads to unloading of stresses and strains in the material, which are caused, e.g., by crystal defects that are already present. The stability of the base material is reduced thereby. If the material has crystalline structures and particularly if it is a single crystal, then it may happen that the crystal is disrupted by slight temperature stress or mechanical loads or shifts in fits and starts along a crystal surface to break down the stresses or strains present in the crystal unit. By the processing of such materials, particularly by grinding and polishing, crystal defects reach the surface due to the abrasion of material associated therewith, so that these crystal defects can unload their stress or strain with a release of energy, which leads to the previously described shift or even to the breaking off of pieces of material of variable size. Such effects are particularly pronounced in soft and highly pure crystals. Foreign atoms introduce defects in highly pure crystals, because their inappropriate size for the most part gives rise to small glassy regions. These glassy regions act as a putty, which macroscopically prevents a sliding of a lattice. Due to the transmission requirement as well as the requirement for maximal homogeneity and minimal strain birefringence, crystals for optical lithography in the UV must be highly pure.

The above-described material defects bring about a further reduction in yield in the production of optical components. If one additionally considers the reduced yields for large-scale technological processes, in any case, in the growing of large, highly homogeneous, oriented single crystals, as are necessary for optical components with a large diameter, such as, for example, in objectives for microlithography, then an increase in the number of discards during processing or production of such optical components leads to an additional enormous reduction in the yield of the total process, which greatly increases costs.

Not only is the minimizing of light scatter of importance, however, for the quality of such high-performance optics, as well as their components or their optical elements, but also their optically active three-dimensional shape or their geometry. It is attempted to adapt the actual shape of the optical component as close as possible to the theoretical shape. This has been done conventionally by producing a negative pattern corresponding to the optimal or theoretical lens or prism shape, in which the finished lens or prism is inserted. Minimal deviations from the optimal fitted shape are then shown as Newtonian rings. The fewer the Newtonian rings that are observed, then the better a finished lens is adapted to the negative shape, i.e., it comes closer to the desired optimal uniform lens curvature or prism angle. The quality of the lens shape is thus also called "fit accuracy" or "simply fit". More modern measurement methods operate without contact by means of interferometers. The shape of the surface is determined in a highly accurate manner with suitable computer evaluation techniques by means of a wave, which is reflected at the test piece, and which is brought to interference with a reference wave.

It has now been found in crystals that by polishing to a small micro-roughness in an attempt to prevent light scatter, a good fit cannot be achieved. On the other hand, if it is attempted to obtain a good fit by intense polishing, then an intensified micro-roughness of the surface occurs and thus there are considerable losses due to light scatter.

SUMMARY OF THE INVENTION

The object of the invention is thus to increase the yield of such production processes for optical components and at the same time to increase the stability of such components, as well as to reduce the micro-roughness and thus the emergence of light scatter as well as simultaneously to produce a good fit.

It has now been found according to the invention that the above-described objectives can be obtained by modeling an optical component in a desired optically active shape each time in a way known in and of itself, then a covering layer is applied, and the fit accuracy is achieved by abrasion of the covering layer. The optically active shape is then usually obtained by finishing a blank, i.e., by removal or targeted erosion of material.

It has now been surprisingly shown that the number of processing steps for the component, particularly grinding and polishing, can be reduced from approximately 20 steps to only a few steps, approximately 5 steps, by the procedure according to the invention, which considerably reduces the exercising of mechanical stress and/or heat stress on the lens.

It has also been shown that the application of a covering layer increases the stability of the optical component, since it counteracts spontaneous changes in the base material of the component, acting as a "belt".

In addition, it has been shown surprisingly, that it is possible in this way to reduce both the micro-roughness and thus the losses due to light scatter as well as to simultaneously achieve a high fit accuracy.

The present invention thus concerns a method for the production of optical components, in which a covering layer is applied onto its surface and then the fit accuracy is adjusted to the desired three-dimensional shape by abrasion of the covering layer.

In principle, any surface of any optical component can be processed by the method according to the invention. Optical lenses, particularly crystal lenses, can be named here as examples.

In a preferred form of embodiment, these optical lenses are comprised of highly crystalline materials, particularly of single crystals. Preferred crystal materials are, for example, NaF, KF, $CaF_2$, $BaF_2$, LiF and $MgF_2$.

In the method according to the invention, a dielectric material is preferably used for the covering layer. Suitable materials for this are, for example, $MgF_2$, $Al_2O_3$, $SiO_2$, diamond-like carbon compounds, or $LaF_3$.

The refractive index of the materials of the covering layer and of the optical base material may be the same or different. However, it is preferred that they are only slightly different. Deviations of up to 30% still produce advantages but particularly those with deviations of up to 10%, and those with only up to 5% deviations have been demonstrated to be particularly suitable. An excellent compensation of optical surface defects is possible with such small differences in the refractive index. If, for example, a lens material has a particularly low refractive index, then it is preferred to use a material which is not highly refractive for the covering layer to be applied. As a rule, it can be established that the refractive index of the initial material of the covering layer is higher and particularly just slightly higher, than that of the material of the optical component. Since deposited layers always have a somewhat smaller index of refraction than dense initial materials (for example, quartz glass relative to the $SiO_2$ layer), the difference in refractive index can thus be kept small.

It has turned out that the covering layer should be applied preferably in a thickness of at least 0.2 μm, particularly in the range of 0.3 to 5 μm. Finally, however, the possible thickness of the covering layer depends on the deposited material and the deposition process. The more compactly the material can be introduced, then the thicker the covering layer can be made. Each time depending on the material, it should also not be made too thick, since if it is, inadmissible mechanical stresses occur.

The covering layer can be applied according to various techniques. Such methods are know to the person of average skill in the art. The material of the covering layer reaches maximum compactness by ion-beam deposition. The conditions employed for this are oriented each time to the material of the covering layer and the optical component.

Prior to applying the covering layer, the optical component is carefully cleaned, in the normal way in order, to remove water, greasy residues and the like from the surface. Then the surface is subjected preferably to a shaping treatment, for example by polishing, particularly by pitch polishing.

It has turned out that the optical component is tempered in a favorable way prior to applying the covering layer and after the preliminary processing. In this way, strains, which are caused by defects in the crystal structure and have arisen due to the sawing and grinding of the surface, are broken down. By the abrasion of material in order to produce a lens shape, the original equilibrated stress state in the grown shape of the crystal is persistently disrupted. By small influences, such as pressure or temperature, the crystal begins to slip in order to adjust to a new equilibrated state of stress. Tempering at temperatures in the range of 70° C. to 150° C. is preferred. A temperature of 115–125° C. is particularly favorable for the breakdown of strain in the crystal after the rough preliminary processing, and a temperature of about 70° C. is suitable after the fine preliminary processing.

BRIEF DESCRIPTION OF THE DRAWINGS

The figures serve to explain the method according to the invention. Here.

DETAILED DESCRIPTION OF THE INVENTION

Figure 1:
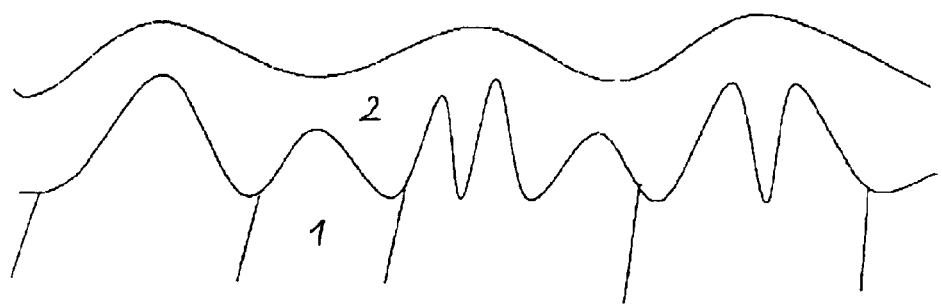
FIG. 1 shows the surface of an optical component, which has the auxiliary layer applied according to the invention.

A surface of an optical component 1 is shown schematically in FIG. 1, on which a covering layer 2 has been applied according to the method of the invention. The surface of component 1 shows a certain micro-roughness, which can be attributed to small elevations. The covering layer 2 applied thereon is adapted to the surface of component 1 and also shows elevations.

Figure 2:
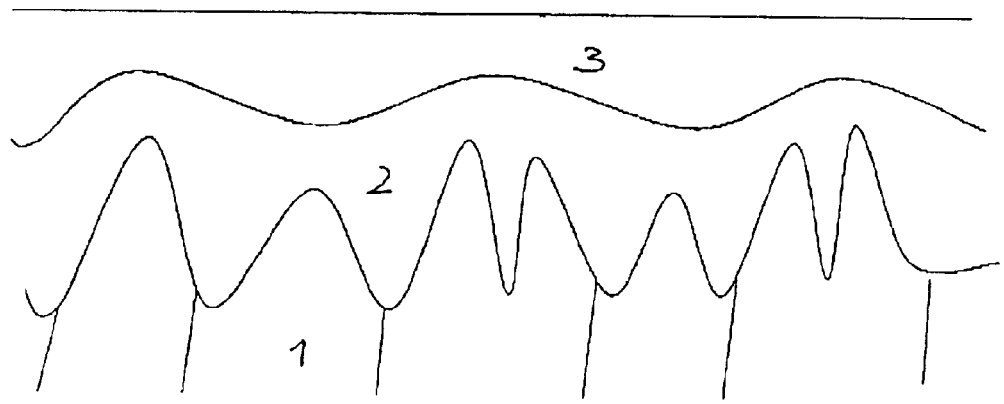
FIG. 2 shows a component produced according to the method of the invention, which has been processed after applying the auxilliary layer.

FIG. 2 shows a covering layer 2 processed according to the method of the invention, which has been applied onto the surface of optical component 1. After a short polishing time, the elevations disappear and the processed surface of the covering layer is free of losses due to light scatter.

Figure 3:
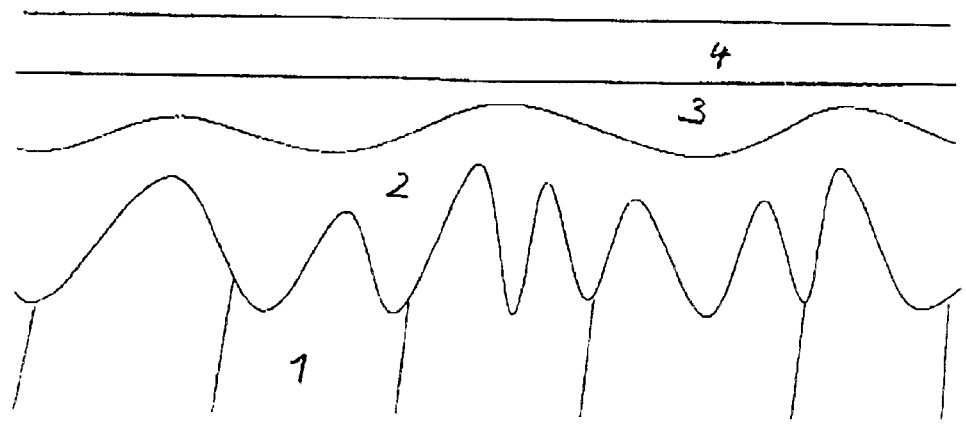
FIG. 3 shows a preferred form of embodiment of the method according to the invention, in which a reflective-reducing layer has been additionally applied after the processing.

FIG. 3 shows a preferred form of embodiment of the method according to the invention. A reflection-reducing layer 4 has been applied by usual methods onto the treated surface of covering layer 3. In this way, a smaller difference in the index of refraction is brought about. This leads favorably to a blooming coat (reduction in reflections).

The performance of the optical component is clearly improved with the processing of the covering layer according to the invention, for example, by polishing. A significant improvement in the losses due to light scatter is assured by the small difference in refractive index between the covering layer and the optical component. If, for example, a refractive index of n=1.40 applies to the optical component and the covering layer to be applied thereon has a refractive index of n=1.45, then the improvement is at least eight times. By examining the component in transmission, long-fit defects that can be present can be still further suppressed, for example, with ion-beam abrasion or robot polishing.

Since optical components are also transported and processed at different temperatures, it is preferable to use materials for the covering layer, whose expansion coefficient does not differ very much from that of the base material. For this reason, the application should not be conducted at temperatures that are too high. Preferably, the expansion coefficients should not differ by more that 20%.

The reduction in process steps in the method according to the invention is also caused by the fact that additional loads of the lens material, which occur with each additional step, are also reduced. For example, in ion-beam abrasion, an intense thermal load of the crystal is produced, so that the crystals fully shift here and there along the crystal surfaces. Due to the application of the covering layer, however, the surface atoms have only a very small possibility of changing places toward the outside.

The invention also concerns the optical components or optical elements obtained with the method according to the invention. The optical elements obtained according to the invention have a reflection-reducing layer that is known in and of itself in between the surface of the base material and the covering layer in a preferred form of embodiment. The production and application of these reflection-reducing layers are known to the person of average skill in the art. According to the invention, it is also possible to apply the reflection-reducing layer after complete manufacture, i.e., after the processing of the covering layer and after obtaining the desired fit accuracy and micro-roughness. In a most particularly preferred form of embodiment, the optical element according to the invention has a reflection-reducing layer between both the base material and covering layer as well as on top of the covering layer.

The optical components processed according to the invention have a high performance capacity so that they can be used in high-performance optics, e.g., as lithography objectives.

The invention thus also concerns the use of the optical components obtained by the method according to the invention for the production of objectives, prisms, light-guiding bars, optical windows, as well as optical components for DUV photolithography, for the production of steppers, laser devices, particularly excimer lasers, wafers, computer chips, as well as integrated circuits and electronic devices that contain such circuits and chips.

The following example of embodiment will further explain the method according to the invention.

EXAMPLE

A crystal lens of $CaF_2$ material obtained from a homogeneous single crystal by sawing and grinding is polished to micro-roughness. Then it is carefully cleaned in order to remove contamination particles and water components on the surface. Another cleaning step is produced in an evaporation device by glow discharge at room temperature in a time period of approximately 30 minutes. In this way, the temperature of the component increases somewhat. Then a covering layer of $SiO_2$ is deposited in a thickness of $0.5\mu$. After deposition, the covering layer is processed by polishing to a water-free state with diamond polishing means. Since the surface now no longer has a direction-dependent hardness in the crystal structure, the triple-wave character that is otherwise common in $CaF_2$ remains clearly smaller. Subsequent processes, such as ion-beam abrasion or robotic polishing, permit a further targeted rapid convergence for improving the fit, since the abrasion process is produced here on an almost glassy surface.

What is claimed is:

1. A method for the production of optical components, particularly of crystalline base material, with elevated stability and an optically active three-dimensional shape of high fit accuracy defined by its surfaces due to shaping the base material into a blank with the desired three-dimensional shape, comprising applying a covering layer onto the surface of the thus-formed three-dimensional shape and the fit accuracy is obtained by abrading the covering layer, wherein said base material comprises a member selected from the group consisting of $CaF_2$, $BaF_2$, LiF, NaF, KF and combinations thereof.

2. The method according to claim 1, wherein said covering layer comprises a member selected from the group consisting of $MgF_2$, $Al_2O_3$, $SiO_2$, pure or mixed, and a diamond-like carbon compound.

3. The method according to claim 1, further comprising tempering the blank prior to applying the covering layer and optionally, post-processing the blank once more for further production of the three-dimensional shape.

4. The method according to claim 1, further comprising processing the covering layer by mechanical abrasion, ion-beam abrasion and/or by laser abrasion.

5. The method according to claim 1, further comprising applying a reflection-reducing layer before and/or after the application of the covering layer.

6. The method according to claim 1, wherein said covering layer has a thickness of at least 0.5 $\mu$m.

7. The method according to claim 1, wherein said covering layer has a thickness of at least 0.2 $\mu$m.

8. An optical element produced by the method of claim 1.

* * * * *